Patented Aug. 5, 1930

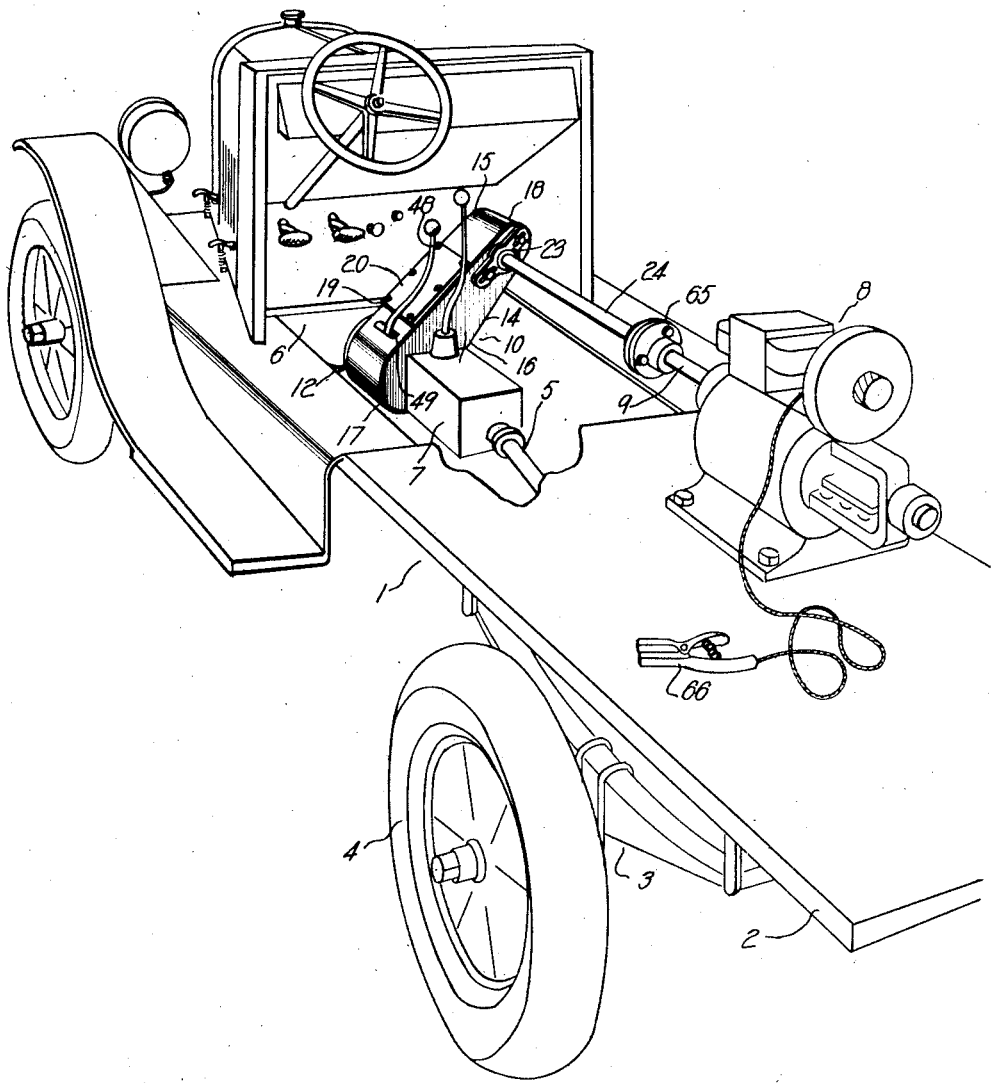

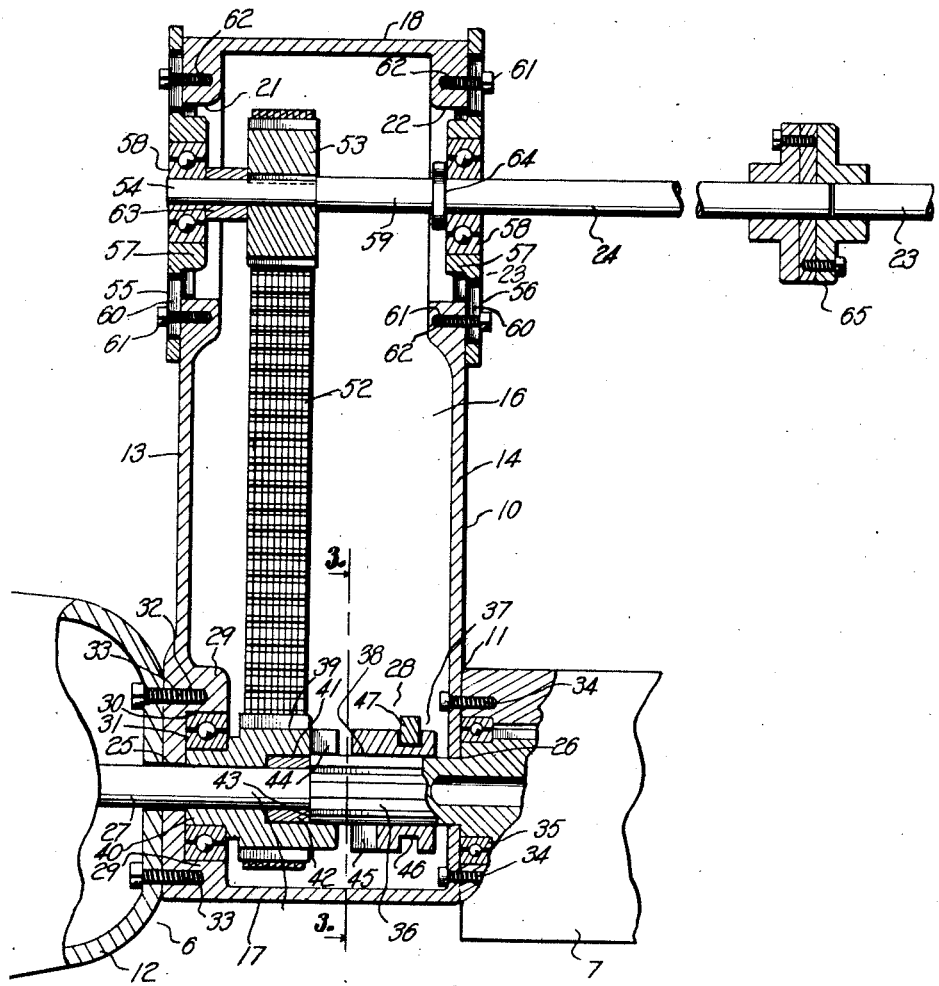
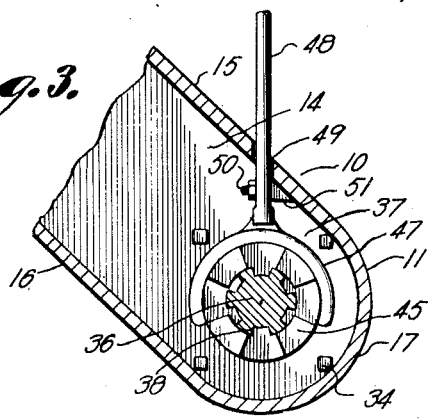

1,772,247

UNITED STATES PATENT OFFICE

CLARENCE C. FORRESTER AND ARCHIE L. HANKS, OF TULSA, OKLAHOMA

POWER TAKE-OFF

Application filed May 17, 1929. Serial No. 363,813.

Our invention relates to power take off devices and more particularly to devices of that character for use on a motor vehicle in connection with the main drive shaft; the principal objects of the invention being to operate auxiliary apparatus on the platform of an automotive vehicle by the main drive shaft of the vehicle, to control such apparatus independently of control of normal transmission for propelling the vehicle, to adapt a drive shaft of an automotive vehicle for transmitting power to auxiliary apparatus, and to facilitate the operation of auxiliary apparatus driven by the driving shaft of the vehicle.

A particular object of our invention is to provide a device of simple construction including clutch transmission mechanism and a driven shaft selectively operable by the transmission for transmitting power to an electric generator on the vehicle platform, whereby electric current may be supplied to an electric welding tool or other electrically operated apparatus.

In accomplishing these and other objects of the invention, we have provided improved details of structure, the preferred forms of which are illustrated in the accompanying drawings, wherein:

Fig. 1 is a perspective view of a motor vehicle provided with our improved power take-off mechanism, with vehicle parts removed for better illustration of the mechanism.

Fig. 2 is a central longitudinal section through the device illustrating its mounting between the motor and transmission of a vehicle and showing the clutch mechanism of the device disengaged.

Fig. 3 is a transverse section through the device on the line 3—3, Fig. 2.

Referring in detail to the drawings:

1 designates a motor driven vehicle, here illustrated as an automotive truck of ordinary type, including a platform or bed 2 mounted on a chassis 3 supported by driving ground wheels 4 operable by a propeller shaft 5 from a motor represented by a housing 6 and adapted to be connected with a transmission represented by a housing 7, all of which may be of ordinary construction except for our improvements hereinafter disclosed.

8 designates an auxiliary power member, here illustrated as an electric generator including a shaft 9 and is mounted on the platform 2 at one side thereof, so that its shaft 9 extends longitudinally of the chassis and in an offset position from the transmission.

Our invention consists chiefly in a power take-off element 10 whereby the auxiliary member is adapted for actuation from the vehicle motor, and includes an elongated housing 11 having its lower end interposed between the end 12 of the motor housing 6 and the transmission 7, extending angularly upwardly toward one side of the chassis and comprising flat substantially parallel side walls 13 and 14 having upwardly converging edges, and top and bottom walls 15 and 16 having rounded lower ends 17 and rounded upper ends 18, the top and bottom walls converging upwardly due to the tapering character of the side wall edges. The top wall has an opening 19 normally closed by a removable cover plate 20 whereby access may be had to the interior of the housing. The arcuate ends of the top and bottom walls meet to form a continuous peripheral wall, and may be integral.

The side walls 13 and 14 are provided adjacent their upper ends with bearing openings 21 and 22 having bearing supports 23 presently described, in axial alignment with the generator shaft 9 for the mounting of a take-off shaft 24 in alignment with the shaft 9, and the lower ends of the side walls are provided with horizontally aligning openings 25 and 26 to receive the motor clutch shaft 27, and for operably connecting an auxiliary transmission mechanism 28 with the shaft 24 as hereafter described.

Formed on the inner side of the side wall 13 in concentric relation with the opening 25 is an annular flange or rib-like boss 29 spaced from the opening to form a recess and a seat 30 for an anti-friction bearing 31 and formed on the outer side of the wall opposite the flange is a raised portion 32 abutting the end 12 of the motor housing 6 and secured thereto by bolts 33 extending into the flange. The opposite wall 14 of the housing 11 is adapted to engage the transmission housing and is secured thereto by bolts 34.

The shaft 27 of the motor extends through the housing 11 and its outer end is journaled in an anti-friction bearing 35 in the transmission housing. The shaft 27 is provided with an enlarged splined portion 36 including splines extending inwardly from the side wall 14 to a point substantially mid-way of the housing 11 and a hollow clutch member 37 having a longitudinally slotted opening 38 is fitted on the splined portion and thereby adapted for rotation with the shaft.

Rotatably mounted on the shaft 27 between the side wall 13 and the splined portion 36 is a sprocket member 39 including a hub having a collar portion 40 at one end of reduced diameter to fit in the bearing 31, and a counterbore 41 in its opposite end to receive a bearing bushing 42 adapted to abut the shoulder 43 at the inner end of the splined portion of the shaft, to retain the sprocket and prevent lateral movement thereof.

Formed on the outer side of the sprocket member 39 and projecting from the counter bored end of the hub, are clutch jaws 44 extending over the splined portion 36 of the shaft 27, and clutch jaws 45 formed on the slidable clutch member 37 are adapted to engage the jaws 44 for operably connecting the sprocket with the shaft.

The clutch member 37 is provided with an annular groove 46 to receive a yoke 47 attached to the bottom end of a shifting lever 48 extending upwardly through a transverse slot 49 in the top wall 15 of the housing adjacent the lower end thereof, and pivotally mounted on a pivot pin 50 secured in a boss 51 protruding from the inner side of the top wall 15. The lever is adapted for shifting the clutch member 37 laterally of the housing 11 on the splined portion of the shaft for engagement with, and disengagement from the clutch jaws 44 on the sprocket 39, and thereby controlling operation of the take-off shaft 24 which is operably connected with the sprocket as presently described.

Operably engaged with the sprocket 39 is a chain belt 52 running on a sprocket 53 keyed to a reduced end portion 54 of the shaft 24 extending in the housing 11 for gearing the driving shaft of the motor with the driven shaft of auxiliary apparatus.

The portion of the shaft 24 that extends through the housing 11 is supported by said bearing members 23 above referred to, which comprise ring-like plates 55 and 56 mounted on the outer sides of the side walls 13 and 14 and provided with hub portions 57 projecting loosely into the openings 21 and 22 in radially spaced relation with the edges of the openings, and fitted with anti-friction bearings 58 engaging the reduced end portion 54 and intermediate portion 59 of the shaft 24. Elongated slots 60 are provided in the support plates for receiving bolts 61 engaging in threaded apertures 62 in the side walls, and adapted for permitting adjustment of the chain belt 52 as presently described.

Mounted on the reduced portion 54 of the shaft 24 between the sprocket 53 and support plate 55 is a spacer sleeve 63 for retaining the sprocket in spaced relation with the side wall 13, and preferably formed integrally with the shaft and abutting the inner side of the bearing in the support plate 56 is a collar 64 for retaining the shaft in the housing, and retaining the sprocket in spaced relation with the side wall 14.

Secured on the outer end of the shaft 24 is a universal coupling 65 adapted to be attached to the generator shaft 23 for effecting a flexible operative connection between the shaft members and permitting adjustment of the shaft 24 relative to the shaft 27.

A supplemental device such as a welding tool 66 may be connected with the auxiliary power member for actuation thereby.

In practicing the invention, the operation is as follows:

When the motor of the vehicle is in operation and the vehicle control clutch is engaged, the motor shaft 27 rotates continuously. While the clutch member 37 is disengaged from the clutch jaws 44 on the sprocket 39 the take-off shaft 24 is uninfluenced by the main drive shaft and remains stationary.

When it is desired to set the electric generator 8 in operation, the vehicle control clutch is released to stop rotation of the motor clutch shaft 27 and permit the clutch member 37 to be shifted by the lever 48 and engaged with the clutch jaws 44 on the sprocket 39.

After the clutch 37 is engaged, the vehicle control clutch is slowly engaged as in starting the vehicle and the power is transmitted through the sprocket 39, chain belt 52, sprocket 53, shaft 24, and universal coupling 65 to the generator shaft 23.

When the electric generator 8 is in operation, the electrical energy produced thereby may be transmitted to the electric welding tool which may be used for welding pipe lines or the like, the vehicle serving to transport the apparatus as required by the progress of the welding operation.

It is obvious from the foregoing description that the power take-off device may also be operated while the vehicle is traveling, and that other means of connection such as pulleys or gears may be applied on the shaft 24 for transmitting power to apparatus other than the electric generator.

What we claim and desire to secure by Letters Patent is:

1. In combination with a motor driven vehicle including a motor with its driving shaft, transmission means operable from said shaft, and a propeller shaft operable from said transmission means for propelling the vehicle, an auxiliary transmission interposed between said motor and said transmission means and including a driven shaft, and means controlling operation of said driven shaft independently of said propeller shaft.

2. In combination with a motor driven vehicle including a motor with its driving shaft, transmission means operable from the shaft, and a propeller shaft operable from said transmission means, a power take-off interposed between the motor and the transmission and including a driven shaft operable by said driving shaft, electric welding means operable from said driven shaft, and means controlling operation of said driven shaft independently of said propeller shaft.

3. In a device of the character described, a housing, a drive shaft extending through one end of the housing, a sprocket wheel loose on the drive shaft and having clutch jaws, a clutch member slidably keyed on the shaft and having cooperating clutch jaws for operably engaging said sprocket wheel, a driven shaft extending through the opposite end of the housing, said opposite end having aligning elongated openings, bearing members mounted in said openings for journaling the driven shaft, means for adjusting the bearings longitudinally in the openings, a sprocket on the driven shaft, a chain operably connecting the sprockets, and means for controlling engagement of the clutch member with the sprocket on said drive shaft.

In testimony whereof we affix our signatures.

CLARENCE C. FORRESTER.
ARCHIE L. HANKS.